US012447404B2

(12) United States Patent
Guo

(10) Patent No.: US 12,447,404 B2
(45) Date of Patent: Oct. 21, 2025

(54) POSITION ADJUSTMENT METHOD AND APPARATUS FOR OPERATION CONTROL, TERMINAL, AND STORAGE MEDIUM

(71) Applicant: TENCENT TECHNOLOGY (SHENZHEN) COMPANY LIMITED, Guangdong (CN)

(72) Inventor: Yating Guo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 370 days.

(21) Appl. No.: 18/296,183

(22) Filed: Apr. 5, 2023

(65) Prior Publication Data

US 2023/0241499 A1 Aug. 3, 2023

Related U.S. Application Data

(63) Continuation of application No. PCT/CN2022/092260, filed on May 11, 2022.

(30) Foreign Application Priority Data

Jun. 18, 2021 (CN) ........................ 202110680988.0

(51) Int. Cl.
*A63F 13/533* (2014.01)
*A63F 13/426* (2014.01)
(Continued)

(52) U.S. Cl.
CPC .......... *A63F 13/533* (2014.09); *A63F 13/426* (2014.09); *A63F 13/55* (2014.09);
(Continued)

(58) Field of Classification Search
CPC ..... A63F 13/533; A63F 13/2145; A63F 13/92
See application file for complete search history.

(56) References Cited

U.S. PATENT DOCUMENTS 9,227,141 B2 * 1/2016 Mays, III ................ A63F 13/22
9,952,755 B2 * 4/2018 Ogiso ................. G06F 3/04845
(Continued)

FOREIGN PATENT DOCUMENTS

CN 106033340 A 10/2016
CN 108635856 A 10/2018
(Continued)

OTHER PUBLICATIONS https://baijiahao.baidu.cotti/s?id=1653970714048332808&wfr spider &for=pc, Dec. 26, 2019.
(Continued)

*Primary Examiner* — James S. McClellan
(74) *Attorney, Agent, or Firm* — Sughrue Mion, PLLC

(57) ABSTRACT

A position adjustment method and apparatus for an operation control, a terminal, and a storage medium. The method includes: displaying a user interface of a game session based on a starting operation for the game session, switching a first operation control from a fixed state to an adjustable state based on a first state switching operation, adjusting, in the adjustable state, a display position of the first operation control based on an adjustment operation for the first operation control, and controlling, in the adjustable state, a virtual object in the game session to perform an action corresponding to the first operation control based on a trigger operation for the first operation control.

20 Claims, 8 Drawing Sheets

(51) Int. Cl.
*A63F 13/55* (2014.01)
*A63F 13/5372* (2014.01)
*A63F 13/5378* (2014.01)

(52) U.S. Cl.
CPC ....... *A63F 13/5372* (2014.09); *A63F 13/5378* (2014.09); *A63F 2300/308* (2013.01)

(56) References Cited

U.S. PATENT DOCUMENTS

| | | | | |
|---|---|---|---|---|
| 10,850,194 | B2 * | 12/2020 | Takagi | A63F 13/2145 |
| 2002/0054144 | A1 * | 5/2002 | Morris-Yates | G06F 3/04847 715/809 |
| 2011/0172013 | A1 * | 7/2011 | Shirasaka | A63F 13/92 345/173 |
| 2011/0285636 | A1 * | 11/2011 | Howard | G06F 3/04883 345/173 |
| 2013/0084980 | A1 * | 4/2013 | Hammontree | A63F 13/2145 463/36 |
| 2014/0364214 | A1 * | 12/2014 | Ayoub | A63F 13/45 463/31 |

FOREIGN PATENT DOCUMENTS

| | | | |
|---|---|---|---|
| CN | 111701226 | A | 9/2020 |
| CN | 111880715 | A | 11/2020 |
| CN | 112083848 | A | 12/2020 |
| CN | 113262476 | A | 8/2021 |
| WO | 2015/122627 | A1 | 8/2015 |

OTHER PUBLICATIONS

Chinese Office Action for 202110680988.0 dated, Oct. 21, 2022.
International Search Report for PCT/CN2022/092260 dated, Aug. 11, 2022 (PCT/ISA/210).
Written Opinion of the International Searching Authority for PCT/CN2022/092260 (PCT/ISA/237).

* cited by examiner

POSITION ADJUSTMENT METHOD AND APPARATUS FOR OPERATION CONTROL, TERMINAL, AND STORAGE MEDIUM

CROSS-REFERENCE TO RELATED APPLICATION(S)

This application is a continuation application of International Application No. PCT/CN2022/092260 filed on May 11, 2022, which claims priority to Chinese Patent Application No. 202110680988.0, filed with the National Intellectual Property Administration, PRC on Jun. 18, 2021, the disclosures of which are incorporated by reference herein in their entireties.

FIELD

The disclosure relates to the technical fields of computers and the Internet, and in particular, to a position adjustment method and apparatus for an operation control, a device, and a storage medium.

BACKGROUND

In a game application (e.g., game battle or battle session), a plurality of operation controls configured to control virtual objects to perform various actions are displayed. In order to improve user's operation efficiency and experience in the game application, a user may adjust a display position of an operation control according to actual needs.

In related technologies, the user adjusts the display position of the operation control through a setting interface. In the setting interface, there is an option for setting the display position of the operation control, and the user may adjust the display position of the operation control in the game battle through an adjustment operation for this option. In addition, a static image of a game battle interface is also displayed in the setting interface. When the user performs the adjustment operation on the foregoing option, the display position of the operation control in the static image is adjusted according to the adjustment operation.

However, in the foregoing related technologies, the user only previews an adjustment effect on the operation control through the static image, needs to start a game battle to perceive the effect of the operation control, determines whether the operation control is adjusted to an appropriate display position based on the effect, and needs to reopen the setting interface to adjust the display position of the operation control in a case that the operation control is not adjusted to the appropriate display position.

SUMMARY

Embodiments of the disclosure provide a position adjustment method and apparatus for an operation control, a terminal, and a storage medium, which can improve the efficiency of position adjustment of an operation control and is conductive to the optimization of a position adjustment effect on the operation control. The technical solutions are as follows:

According to some embodiments, a position adjustment method for an operation control is provided. The method is performed by a computer device and includes:

displaying a user interface of a game session based on a starting operation for the game session, the user interface displaying at least one operation control;

switching a first operation control of the at least one operation control from a fixed state to an adjustable state based on a first state switching operation;

adjusting, in the adjustable state, a display position of the first operation control based on an adjustment operation for the first operation control; and controlling, in the adjustable state, a virtual object in the game session to perform an action corresponding to the first operation control based on a trigger operation for the first operation control.

According to some embodiments of the disclosure, a position adjustment apparatus for an operation control is provided. The apparatus includes: at least one memory configured to store program code; and at least one processor configured to read the program code and operate as instructed by the program code, the program code comprising:

interface display code configured to cause the at least one processor to display a user interface of a game session based on a starting operation for the game session, the user interface displaying at least one operation control;

state switching code configured to cause the at least one processor to switch a first operation control of the at least one operation control from a fixed state to an adjustable state based on a first state switching operation;

position adjustment code configured to cause the at least one processor to adjust, in the adjustable state, a display position of the first operation control based on an adjustment operation for the first operation control; and object control code configured to cause the at least one processor to control, in the adjustable state, a virtual object in the game session to perform an action corresponding to the first operation control based on a trigger operation for the first operation control.

According to an aspect of the embodiments of the disclosure, a terminal is provided. The terminal includes a processor and a memory, the memory stores at least one fragment of program, and the at least one fragment of program is loaded and executed by the processor to perform the foregoing position adjustment method for an operation control.

According to some embodiments of the disclosure, a non-transitory computer-readable storage medium storing computer code that when executed by at least one processor causes the at least one processor to perform the foregoing position adjustment method for an operation control.

According to some embodiments of the disclosure, a computer program product or computer program is provided. The computer program product or computer program includes computer instructions, and the computer instructions are stored in a computer-readable storage medium. A processor of a terminal reads the computer instructions from the computer-readable storage medium and executes the computer instructions to cause the terminal to perform the foregoing position adjustment method for an operation control.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

The operation control is switched from the fixed state to the adjustable state through the first state switching operation, and under the adjustable state, the display position of the operation control can be adjusted in response to the adjustment operation and the virtual object can be controlled to perform the corresponding action in response to the trigger operation. That is, in a case that a user adjusts the display position of the operation control, the operation control can respond to user's trigger operation, so that the user can control the virtual object. In this way, after adjusting the display position of the operation control, the user can use the operation control in real time and then determine whether the effect (e.g., efficiency and use feel) of the operation control meets user's needs. Furthermore, during use of the operation control, the operation control is still in the adjustable state, and in a case that user is not satisfied with a previous position adjustment result, the user may continue to adjust the display position of the operation control without reopening a setting interface of the operation control, which improves the efficiency of position adjustment of the operation control. Moreover, during position adjustment, the operation feel of the operation control is determined by using the operation in real time, which is conductive to the optimization of a position adjustment effect on the operation control.

Figure 1:
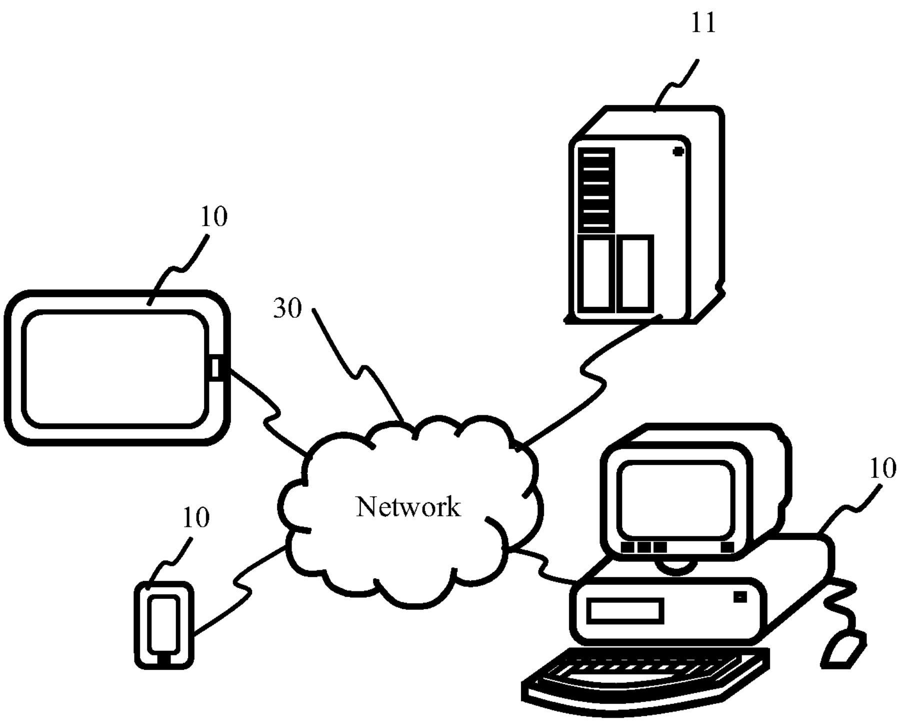
FIG. 1 is a schematic diagram of a running environment of an application program according to some embodiments.

FIG. 1 shows a schematic diagram of a running environment of an application program according to some embodiments. The running environment of the application program includes: a terminal 10 and a server 11.

The terminal 10 is also referred to as a terminal device, and may be an electronic device such as a mobile phone, a tablet computer, a game console, an e-book reader, a multimedia playback device, a wearable device, and a personal computer (PC). A client of a target application program may be installed in the terminal 10, and the target application program may be any application program capable of displaying an operation control. For example, the target application program may be a game application program, a social application program, a reading application program, a shopping application program, and the like. The target application program may be an application program that needs to be downloaded and installed, or may be a click-to-run application program.

The server 11 is configured to provide backend services for the client of the target application program in the terminal 10. For example, the server 11 may be a backend server for the foregoing target application program. The server 20 may be a server, or may be a server cluster including a plurality of servers, or a cloud computing service center. In some embodiments, the server 20 provides backend services for target application programs in a plurality of terminals 10.

The terminal 10 and the server 11 may communicate with each other through a network 30.

Figure 2:
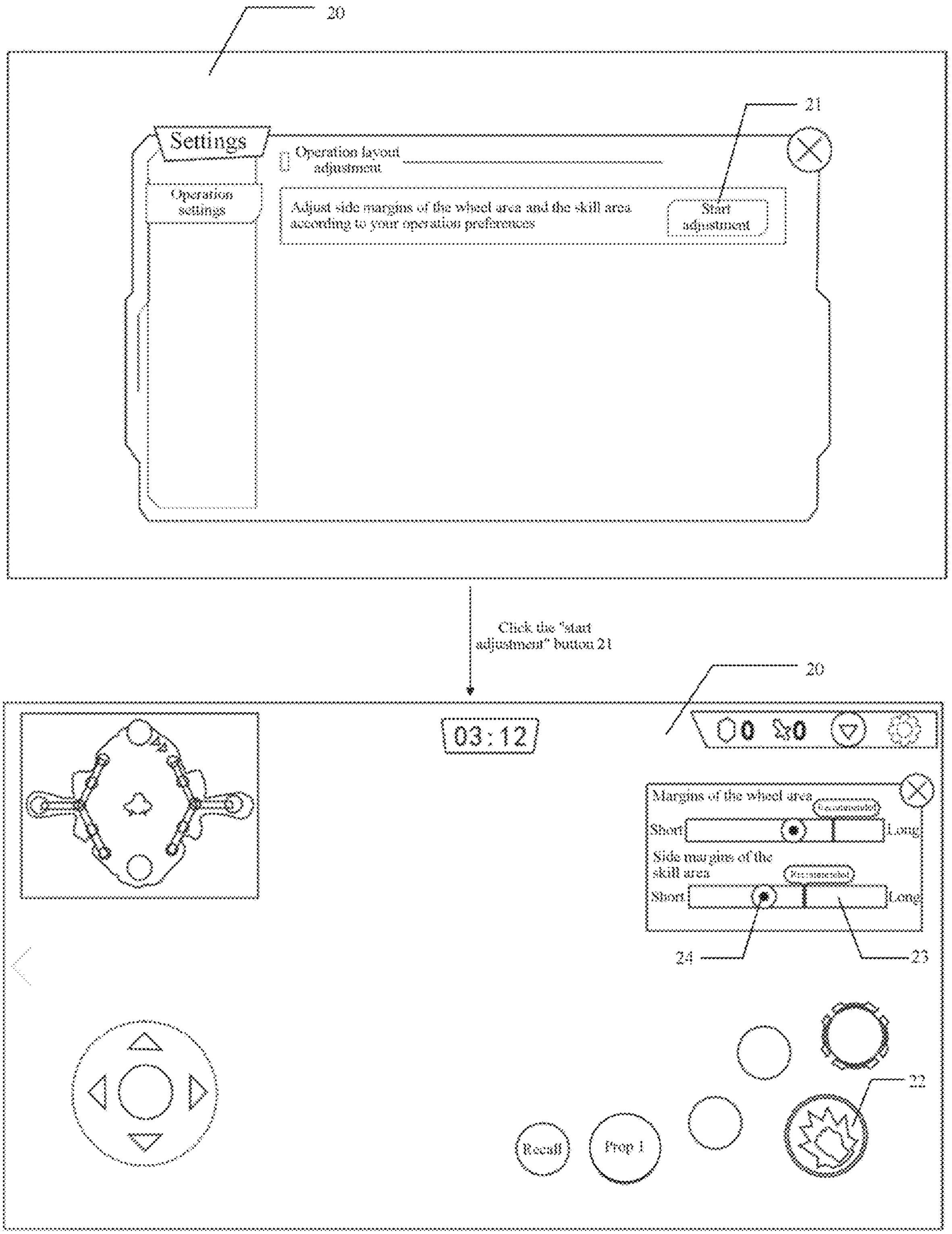
FIG. 2 is a schematic diagram of an example of a user interface during adjustment of an operation control according to some embodiments.

In some embodiments, the foregoing operation control is an operation control with an adjustable display. As shown in FIG. 2, a user interface 20 displays a "start adjustment" button 21 for an operation control. After a user clicks the "start adjustment" button 21, the operation control is switched from a fixed state to an adjustable state, and various operation controls and position adjustment progress bar respectively corresponding to the operation controls are displayed in the user interface 20. Taking a first operation control 22 as an example, the user adjusts a display position of the first operation control 22 in the user interface 20 by adjusting a position marker 24 in a position adjustment progress bar 23.

Figure 3:
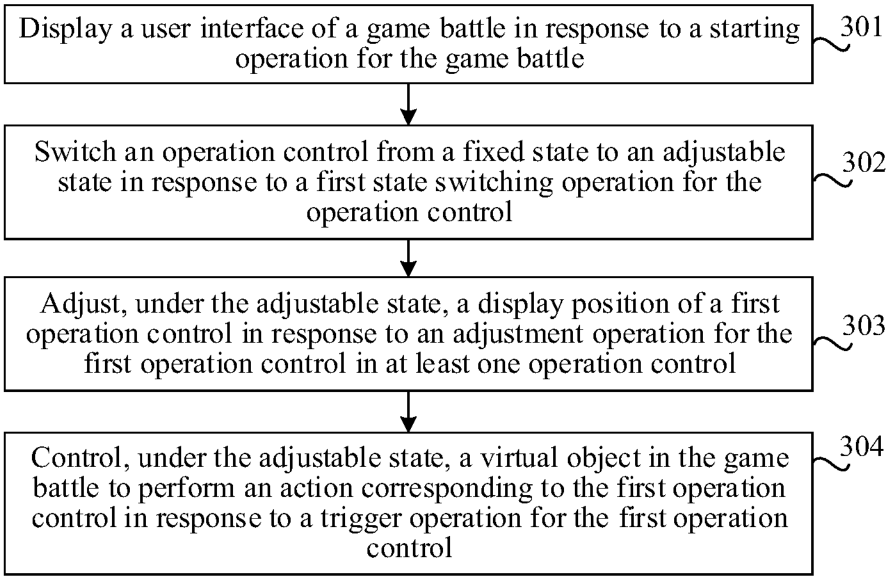
FIG. 3 is a flowchart of a position adjustment method for an operation control according to some embodiment.

FIG. 3 shows a flowchart of a position adjustment method for an operation control according to some embodiments. The method is applicable to the terminal 10 in the running environment of the application program shown in FIG. 1. For example, an execution entity of each operation may be a client of a target application program that is installed and run in the terminal 10. The method may include at least one of the following operations (301 to 304):

Operation 301: Display a user interface of a game application (e.g., game battle, or game session) in response to a starting operation for the game application.

The starting operation is an operation that is triggered and generated by a user to start a game application (e.g., game battle or game session). Hereinafter, for illustrative purposes, a game battle is described as an example but the disclosure is not limited thereto. In some embodiments, the user triggers and generates the foregoing starting operation through a trigger operation for a game battle starting control. The game battle starting control is displayed in the user interface after the foregoing target application program is run. For example, after the target application program is run, the game battle starting control is displayed in an interface of the target application program, and a user interface of a game battle is displayed in the interface based on a trigger operation of the user for the game battle starting control is detected. In some embodiments, the target application program may provide the user with different modes of game battles, such as an "instant kill game mode", a "5v5 game mode", and a "3v3 game mode". Before starting a game battle, the user may select a mode of a game battle in a mode selection interface, and then a user interface of a game battle of a certain mode is displayed based on the client detecting a starting operation for the game battle of the mode. A starting operation for a game battle of a certain mode is a trigger operation for a game battle starting control of the mode.

In some embodiments, display contents in user interfaces corresponding to different modes of game battles are different. For example, different modes provide the user with different interaction scenes (also referred to as virtual environments, virtual scenes, and the like). In addition, display contents in user interfaces corresponding to different game battles of the same mode may also be different. For example, for the same mode, the content contained in each game battle is different. The content contained in the game battle includes, but is not limited to, at least one of: a virtual object controlled by a user, a virtual object controlled by a computer program, and a virtual item in a virtual environment. The foregoing virtual object controlled by a user may be selected from a plurality of virtual objects by the user, and different virtual objects correspond to different appearances and/or skills. The foregoing virtual item in a virtual environment may be a virtual item randomly allocated to a game battle.

In some embodiments, in a case that the client detects a starting operation for a game battle, the client displays a user interface of the game battle. The user interface is configured to show a user the content of the game battle. In some embodiments, user interfaces corresponding to different game battles are displayed in different ways.

In some embodiments, in order to ensure the timeliness of displaying the user interface, when displaying the user interface of the game battle, the client renders the user interface according to display elements stored in the client to display the foregoing user interface of the game battle. In some embodiments, the foregoing stored display elements are stored during download of a target application program, that is, the client displays the foregoing user interface according to information stored during download of the target application program. In some embodiments, the foregoing stored display elements are stored after a previous game battle is started, that is, the client displays the foregoing user interface according to information stored in the last game battle. In some embodiments, in a case that no game battle is started, the client may obtain new display elements from the server at certain time intervals, and updates the previously stored display elements with the new display elements. When updating the previously stored display elements, the client may directly overwrite the previously stored display elements with the new display elements, or may obtain display elements, different from the previously stored display elements, from the new display elements, and performs an operation, such as addition, deletion, and replacement, on the different display elements.

In some embodiments, in order to ensure the consistency of user interfaces displayed to different users, when displaying the user interface of the game battle, the client obtains display elements of the user interface through the server, and renders the user interface through the display elements so as to display the foregoing user interface of the game battle.

The foregoing display elements include, but are not limited to, at least one of: a text element, an image element, a sound element, and the like.

In some embodiments, the foregoing user interface displays at least one operation control. In some embodiments, the operation control is directly displayed or displayed in an implicit way in the user interface.

In some embodiments, the foregoing operation control is directly displayed in the user interface. In some embodiments, when displaying the foregoing user interface, the client renders and displays an operation control in the user interface based on display elements corresponding to the operation control. The display elements corresponding to the operation control may be rendered and displayed in a trigger region corresponding to the operation control.

In some embodiments, the foregoing operation control is displayed in an implicit way in the user interface. In some embodiments, when displaying the foregoing user interface, the client does not need to obtain the display elements of the operation control, and determines a trigger region corresponding to the operation control only, so as to ensure that an action corresponding to a corresponding operation control in a case that a trigger operation for the trigger region is detected subsequently.

In some embodiments, the foregoing operation control is displayed in a semi-implicit way in the user interface. In some embodiments, when displaying the foregoing user interface, the client does not need to obtain display elements of an operation control, determines a trigger region corresponding to the operation control only, and displays the operation control corresponding to the trigger region in the user interface when detecting a trigger operation for the trigger region.

Operation 302: Switch the operation control from a fixed state to an adjustable state in response to a first state switching operation for the operation control.

The fixed state refers to a state in which a display position of the operation control is fixed. The adjustable state refers to a state in which the display position of the operation control is moveable. The first state switching operation refers to an operation that is triggered by a user to switch a current state of the operation control. In some embodiments, the user triggers and generates the foregoing first state switching operation through a trigger operation for a state switching control. The trigger operation may be a short-press operation, a long-press operation, a single-click operation, a double-click operation, a drag operation, a voice operation, and the like, which is not defined in the embodiments of this application.

In some embodiments, in a case that the client detects the first state switching operation for the operation control, the client switches the operation control from the fixed state to the adjustable state. In some embodiments, display styles corresponding to the operation control in different states are different.

Figure 4:
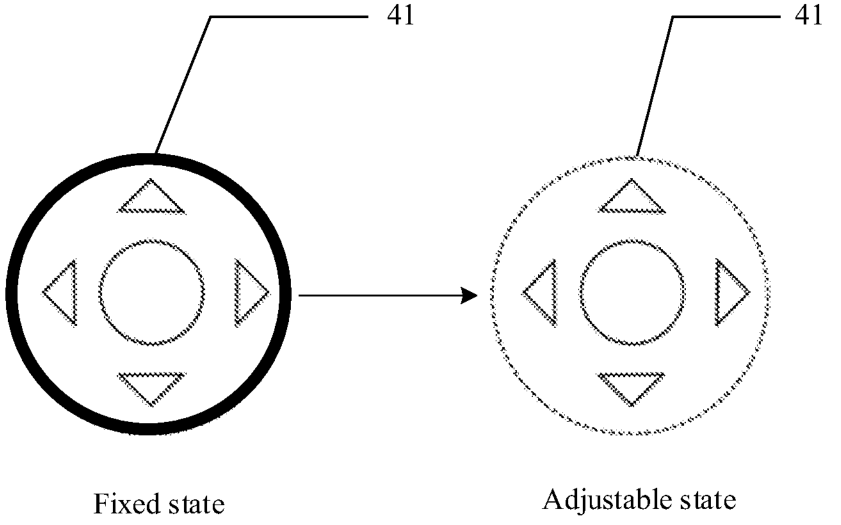
FIG. 4 is a schematic diagram of an example of display styles of a first operation control in different states according to some embodiments.

In some embodiments, after a game battle is started, the operation control is in the fixed state, and at this moment, the operation control is displayed in a first display style in the user interface. Then, the client detects the foregoing first state switching operation, switches the operation control from the fixed state to the adjustable state according to the first state switching operation, and switches the display style of the operation control from the first display style to a second display style. Differences between the first display style and the second display style include, but are not limited to, at least one of: different colors, different lines, different textures, different patterns, different rendering effects, and the like. In some embodiments, as shown in FIG. 4, in a case that the operation control 41 is in the fixed state, the operation control 41 is displayed in the form of a solid line; and in a case that the operation control is in the adjustable state, the operation control 41 is displayed in the form of a dotted line.

Operation 303: Adjust, under the adjustable state, a display position of a first operation control in response to an adjustment operation for the first operation control in the at least one operation control.

In some embodiments, under the foregoing adjustable state, in a case that the client detects an adjustment operation for a first operation control in at least one operation control, the client adjusts a display position of the first operation control. The first operation control may be any operation control in the at least one operation control, and the adjustment operation may be an operation triggered and generated by the user. For example, the adjustment operation may be a short-press operation, a long-press operation, a single-click operation, a double-click operation, a drag operation, a voice operation, and the like.

In some embodiments, the foregoing first state switching operation corresponds to a second state switching operation. After adjusting the display position of the foregoing first operation control, the client switches the first operation control from the adjustable state to the fixed state in a case that the clients detect a second state switching operation for the first operation control, and transmits position adjustment information to the server. The position adjustment information is used for instructing the server to record a current display position of the first operation control, so that the client displays the first operation control based on the current display position of the first operation control that is recorded this time when a next game battle is started.

In some embodiments, the foregoing second state switching operation and the foregoing first state switching operation may be triggered and generated through the same trigger operation for the same state switching control. For example, after detecting a trigger operation for the state switching control, the client determines that the trigger operation is the first state switching operation in a case that the operation control is in the fixed state; and determines that the trigger operation is the second state switching operation in a case that the operation control is in the adjustable state.

In some embodiments, the foregoing second state switching operation and the foregoing first state switching operation correspond to the same state switching control and different trigger operations, that is, the second state switching operation and the first state switching operation may be triggered and generated through different trigger operations for the same state switching control. For example, after detecting a trigger operation for the state switching control, the client obtains attribute information of the trigger operation, and determines that the trigger operation is the first state switching operation in a case that the attribute information includes first attribute information (such as clicking once, pressing for less than a certain value, and dragging to the left); and determines that the trigger operation is the second state switching operation in a case that the attribute information includes second attribute information (such as clicking twice, pressing for greater than a certain value, and dragging to the right).

In some embodiments, the foregoing second state switching operation and the foregoing first state switching operation correspond to different state switching controls, that is, the second state switching operation and the first state switching operation may be triggered and generated through trigger operations for different state switching controls. For example, in a case that the client detects a trigger operation for a first state switching control, the client determines that the trigger operation is the first state switching operation; and in a case that the client detects a trigger operation for a second state switching control, the client determines the trigger operation is the second state switching operation. A relative position between the foregoing first state switching control and the foregoing second state switching control may be any relative position.

In some embodiments, the foregoing second state switching operation and the foregoing first state switching operation correspond to the same state switching control and the same trigger operation, that is, the second state switching operation and the first state switching operation may be triggered and generated through the same trigger operation for the same state switching control. For example, after detecting a trigger operation for the state switching control, the client determines that the first state switching operation for the operation control is detected in a case that the operation control is in the fixed state; and correspondingly, after detecting a trigger operation for the state switching control, the client determines that the second state switching operation for the operation control is detected in a case that the operation control is in the adjustable state.

Operation 304: Control, under the adjustable state, a virtual object in the game battle to perform an action corresponding to the first operation control in response to a trigger operation for the first operation control.

In some embodiments, under the foregoing adjustable state, in a case that the client detects a trigger operation for the first operation control, the client controls a virtual object in the game battle to perform an action corresponding to the first operation control. The foregoing virtual object is a virtual object controlled by a user account, and the user account may control one or more virtual objects, which is not defined herein. The foregoing trigger operation may be a single-click operation, a double-click operation, a long-press operation, a short-press operation, a slide operation, and the like.

In some embodiments, different operation controls correspond to different trigger operations. For example, in a case that the first operation control is an operation control configured to control a virtual object to cast a skill, the foregoing trigger operation may be a click operation. When detecting the click operation for the first operation control, the client controls the virtual object to cast a corresponding skill. In a case that the first operation control is a slider configured to control a virtual object to move, the foregoing trigger operation may be a slide operation. When detecting the slide operation for the first operation control, the client determines that a slide direction of the slide operation is a movement direction of the virtual object, and controls the virtual object to move; and the like. In some embodiments, the same operation control may correspond to different trigger operations, and different trigger operations correspond to different actions. For example, in a case that the first operation control corresponds to a single-click operation and a double-click operation, when detecting the single-click operation for the first operation control, the client switches the virtual object from a standing posture to a squatting posture, and when detecting the double-click operation for the first operation control, the client switches the virtual object from a standing posture to a lying posture.

In some embodiments, the first operation control corresponds to a trigger region, and in a case that the client detects a trigger operation, the client obtains a trigger position of the trigger operation and then determines whether the trigger operation is located in the trigger region of the first operation control based on the trigger position. In a case that the trigger operation is located in the trigger region of the first operation control, it is determined that the trigger operation is a trigger operation for the first operation control, and the virtual object is controlled to perform a corresponding action. The foregoing trigger region is larger than or equal to a display region of the first operation control. For example, the trigger region is a region formed by a set of points whose distances to a center point of the first operation control are less than a target value.

Based on the above, the operation control is switched from the fixed state to the adjustable state through the first state switching operation, and under the adjustable state, the display position of the operation control can be adjusted in response to the adjustment operation and the virtual object can be controlled to perform the corresponding action in response to the trigger operation. That is, in a case that a user adjusts the display position of the operation control, the operation control can respond to user's trigger operation, so that the user can control the virtual object. In this way, after adjusting the display position of the operation control, the user can use the operation control in real time and then determine whether the effect (e.g., use feel) of the operation control meets user's needs. Furthermore, during use of the operation control, the operation control is still in the adjustable state, and in a case that the user is not satisfied with a previous position adjustment result, the user may continue to adjust the display position of the operation control without reopening a setting interface of the operation control, which improves the efficiency of position adjustment of the operation control. Moreover, during position adjustment, the operation feel of the operation control is determined by using the operation control in real time, which is conductive to the optimization of a position adjustment effect on the operation control.

In some embodiments, the operation control is controlled to switch from the fixed state to the adjustable state through the first state switching operation, the virtual object is controlled to perform a corresponding action through a trigger operation, and the operation control is controlled to switch from the adjustable state to the fixed state through the second state switching operation, that is, an operation that is used for controlling the state change of the operation control and is different from an operation for controlling a first virtual object to perform an action without interfering each other. When controlling the virtual object to perform an action, the user does not need to take into account the state of the operation control, which improves the flexibility of user operation and the intensity of a game battle. After the operation control is switched from the adjustable state back to the fixed state, the server records the position adjustment information of the operation control, and the position adjustment information of this time may be directly obtained from the server in a subsequent game battle, and it is unnecessary to readjust the position of the operation control in each game battle, which simplifies user operations.

A method for adjusting the display position of the first operation control will be described below.

In some embodiments, the client adjusts the display position of the first operation control based on an effect of the adjustment operation. In some embodiments, when detecting the first state switching operation for the operation control, the client displays an adjustment window. In some embodiments, when detecting the foregoing first state switching operation, the client obtains position information of the foregoing at least one operation control, and displays the foregoing adjustment window based on the position information, so that the adjustment window displays the position information of the at least one operation control.

In some embodiments, the foregoing adjustment window displays a position adjustment control configured to adjust a display position of an operation control, the foregoing adjustment operation is an operation for the position adjustment control, and in a case that the client detects the operation for the position adjustment control, the client adjusts the display position of the first operation control.

In some embodiments, the foregoing position adjustment control includes a position adjustment progress bar, and the position adjustment progress bar displays a position marker. In some embodiments, different operation controls correspond to different position adjustment progress bars, and the different position adjustment progress bars display position markers corresponding to corresponding operation controls; or different operation controls correspond to the same position adjustment progress bar, and the position adjustment progress bar displays position markers corresponding to the different operation controls. Taking the first operation control as an example, when displaying the foregoing adjustment window, the client obtains the display position of the first operation control in the user interface, and determines a display position, on the position adjustment progress bar, of a position marker corresponding to a first operation progress bar. For example, in a case that a distance between a center point of the first operation control and a boundary line of the user interface is equal to half the length of the user interface, the position marker of the first operation control is located in the center of the position adjustment progress bar.

In some embodiments, the foregoing position adjustment control includes a user interface thumbnail, and the user interface thumbnail displays the position marker. In some embodiments, different operation controls correspond to different user interface thumbnails, and the different user interface thumbnails display position markers corresponding to corresponding operation controls; or different operation controls correspond to the same user interface thumbnail, and the user interface thumbnail displays position markers corresponding to different operation controls. Taking the first operation control as an example, when displaying the foregoing adjustment window, the client obtains the display position of the first operation control in the user interface, and determines a display position, on the user interface thumbnail, of a position marker corresponding to a first operation progress bar. The user interface thumbnail may be an image obtained by zooming the display content of the user interface in real time, or may be a pre-stored zoomed image of the user interface.

In some embodiments, the foregoing position adjustment control includes position movement buttons corresponding to different directions. In some embodiments, different operation controls correspond to different position movement sliders. Taking the first operation control as an example, when displaying the foregoing adjustment window, the client obtains position parameters of the first operation control on the user interface, and the position parameters in the adjustment window are changed with the adjustment of the position of the first operation control when the display position of the first operation control is adjusted through the position movement buttons. The foregoing position parameters include, but are not limited to, at least one of: coordinates of the first operation control on the user interface, a distance between the first operation control and the boundary line of the user interface, a distance between the first operation control and a center line of the user interface, and the like.

The foregoing position adjustment control includes a position adjustment progress bar and the position adjustment progress bar displays a position marker in some embodiments, the foregoing operation 303 includes at least one of the following operations:

1. Determine a position of the position marker in the position adjustment progress bar in response to a movement operation for the position marker.

In some embodiments, the foregoing operation for the position adjustment control is a movement operation for the position marker, after displaying the foregoing adjustment window, in a case of detecting the movement operation for the position marker, the client obtains a position of the position marker in the position adjustment progress bar based on the movement operation.

In some embodiments, after detecting the foregoing movement operation, the client obtains an end position of the movement operation on the position adjustment progress bar, and determines that the end position is a position of the position marker on the position adjustment progress bar. In some embodiments, the client may also obtain a position of a finger of the user on the adjustment progress bar in real time during the movement operation, and adjusts and displays the position of the position marker in real time.

In some embodiments, after detecting the foregoing movement operation, the client obtains a movement distance of the movement operation on the position adjustment progress bar, takes the distance as a movement distance of the position marker on the position adjustment progress bar, and determines a position of the position marker on the position adjustment progress bar. In some embodiments, the client may also determine a real-time movement distance of the position marker according to a real-time movement distance of a movement position, and adjusts and displays the position of the position marker in real time.

2. Determine a margin of the first operation control relative to a boundary line of the user interface according to the position of the position marker in the position adjustment progress bar.

In some embodiments, after obtaining the position of the position marker in the position adjustment progress bar, the client determines the margin of the first operation control relative to the boundary line of the user interface according to the position of the position marker in the position adjustment progress bar. The boundary line may be all boundary lines, such as an upper boundary line, a lower boundary line, a left boundary line, and a right boundary line. In some embodiments, the boundary line may be two boundary lines perpendicular to each other, such as an upper boundary line and a left boundary line, and an upper boundary line and a right boundary line. In some embodiments, the boundary line may be a boundary line closest to the first operation control. In some embodiments, the boundary line is related to an adjustment direction of the first operation control, and in a case that the adjustment direction of the first operation control is left-right adjustment and a distance between the first operation control and a right boundary line is less than that between the first operation control and a left boundary line, the foregoing boundary line may be the right boundary line.

In some embodiments, terminals of different modes display user interfaces of different display sizes, when determining the foregoing margin, the client may obtain a display size of the user interface, takes the position marker as a division point, determines a ratio of a length of a progress bar on the right side of the position marker to the total length of the position adjustment progress bar, and determines a margin of the first operation control relative to a boundary line of the user interface according to the ratio and the display size. In this case, the boundary line may be a right boundary line. Similarly, the client may also take the position marker as a division point, determines a ratio of a length of a progress bar on the left side of the position marker to the total length of the position adjustment progress bar, and determines a margin of the first operation control relative to a boundary line of the user interface according to the ratio and the display size. In this case, the boundary line may be a left boundary line.

In some embodiments, the length of the position adjustment progress bar corresponds to a target display length of the user interface. When determining the foregoing margin, the client determines a margin of the first operation control relative to a boundary line of the user interface according to a position of the position marker on the position adjustment progress bar and the foregoing target display length. The target display length may be a complete display length of the user interface, or may be a partial display length of the user interface.

In some embodiments, correspondence between the length of the position adjustment progress bar and the display length of the user interface is stored in a pre-set list. During determination of the foregoing margin, the client determines correspondence between the length of the position adjustment progress bar and the display length of the user interface according to the pre-stored list, and determines a margin of the first operation control relative to a boundary line of the user interface according to a position of the position marker on the position adjustment progress bar and the foregoing display length.

3. Adjust a display position of the first operation control, so that a distance between the first operation control and the boundary line of the user interface is equal to the margin.

In some embodiments, after obtaining the foregoing margin, the client adjusts the display position of the first operation control according to the margin, so that a distance between the first operation control and the boundary line of the user interface is equal to the margin.

In some embodiments, the display position of the first operation control may be adjusted after the position marker is moved, or the display position of the first operation control is adjusted in real time during the movement of the position marker. In some embodiments, after the position marker is moved, the client adjusts the display position of the first operation control according to a position of the position marker in the position adjustment progress bar. In another possible embodiment, during the movement of the position marker, the client obtains a position of the position marker in the position adjustment progress bar in real time, and adjusts the display position of the first operation control in real time, which helps the user grasp the position adjustment of the first operation control in real time.

Figure 5:
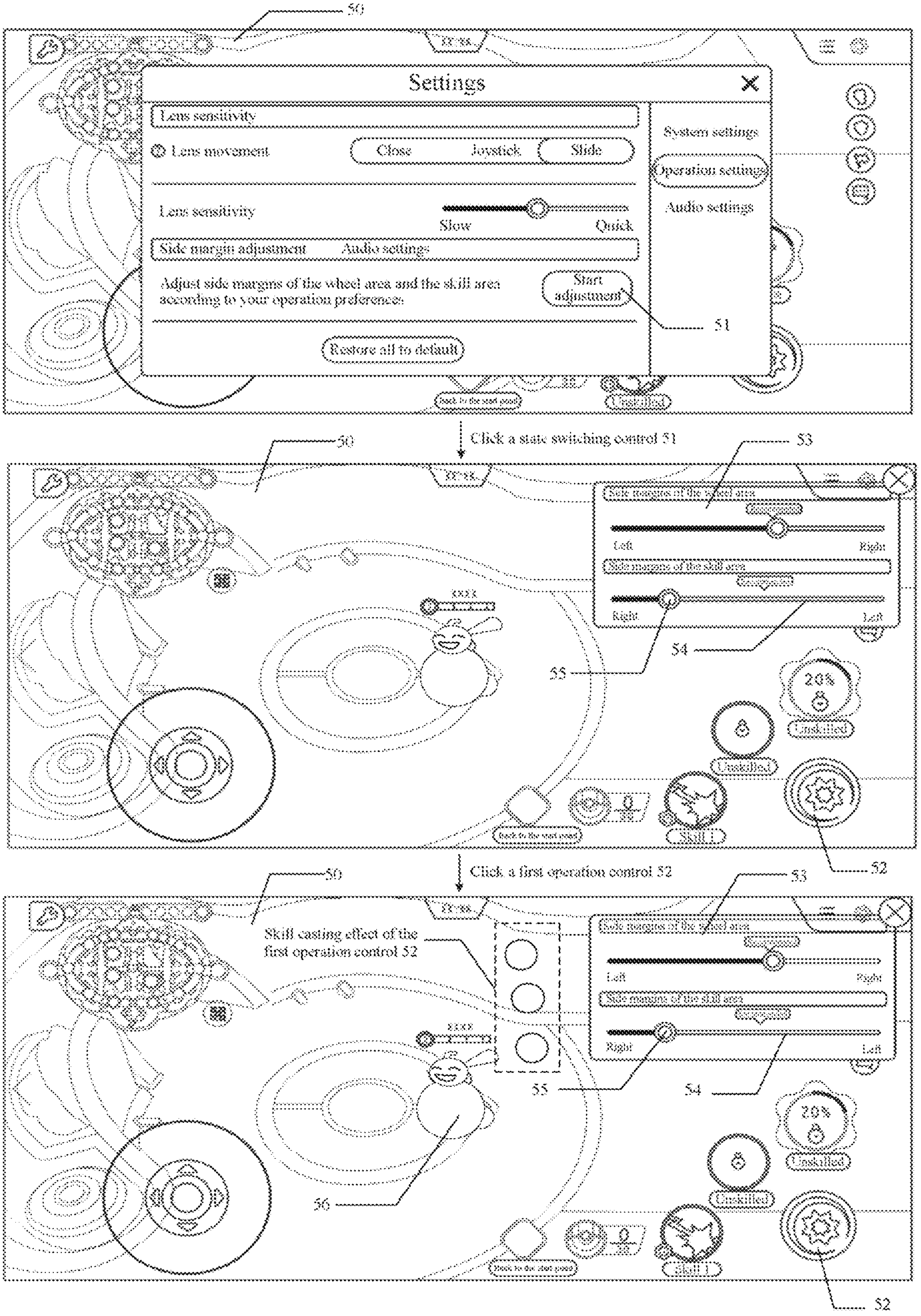
FIG. 5 is a schematic diagram of an example of a user interface during adjustment of another operation control according to some embodiments.

In some embodiments, with reference to FIG. 5, the user interface 50 includes a state switching control 51, and the user clicks the state switching control 51 to switch the first operation control 52 from the fixed state to the adjustable state. At this moment, the user interface 50 displays an adjustment window 53, the adjustment window 53 includes a position adjustment progress bar 54 of the first operation control 52, the position adjustment progress bar 54 displays a position marker 55 of the first operation control, and the user adjusts the display position of the first operation control 52 through a movement operation for the position marker 55. Moreover, after the foregoing position adjustment, the first operation control 52 is kept in the adjustable state, and the user click the first operation control 52 to control a virtual object 56 to cast a skill.

In some embodiments, the display position of the operation control is adjusted through the position adjustment control in the display window, the position of the operation control is adjusted through the display window in the game battle, a position adjustment region is distinguished from a touch region of the operation control to avoid false touches of the trigger operation caused during position adjustment. Moreover, the display position of the operation control is determined according to the position of the position marker in the position adjustment progress bar, the position marker is associated with the display position of the operation control, and compared with the abstract parameter adjustment, the user may more intuitively grasp the display position of the first operation control according to the position of the position adjustment point, which simplifies user operations and improves the efficiency of adjustment of the display position of the operation control.

In addition, the margin between the first operation control and the boundary line of the user interface is determined according to the display size of the user interface and the ratio of the length of the progress bar on the right side of the position marker to the total length of the position adjustment progress bar. Different hardware devices have display screen of different size, user interfaces in different display screens correspond to different display sizes, and the compatibility of adjusting the operation control in different hardware devices is improved according to the margin of the display size.

In some embodiments, the client adjusts the display position of the first operation control based on attribute information of the adjustment operation. In some embodiments, the foregoing adjustment operation is a drag operation and the foregoing operation 303 may include at least one of the following operations.

1. Obtain attribute information of a drag operation in response to the drag operation for the first operation control.

In some embodiments, based on the first operation control being in the adjustable state when detecting a drag operation for the first operation control, the client obtains attribute information of the drag operation. The attribute information includes, but is not limited to, at least one of: a drag distance, a drag speed, an end position of a drag operation, and the like.

The foregoing drag operation for the first operation control is a different operation from the foregoing trigger operation for the first operation control. For example, the trigger operation for the first operation control may be a click operation; or, the trigger operation for the first operation control is a slide operation with a slide distance less than a first value, and the drag operation for the first operation control is a drag operation with a drag distance greater than a second value, and the first value is less than or equal to the second value.

2. Determine movement parameters of the first operation control based on the attribute information.

In some embodiments, after obtaining the foregoing attribute information, the client determines movement parameters of the foregoing first operation control based on the attribute information. The movement parameters include, but are not limited to, at least one of: a movement direction, a movement distance, and a position to which the first operation control is moved. The position to which the first operation control is moved is a display position of the first operation control after position adjustment.

In some embodiments, the foregoing movement parameters include a movement direction and a movement distance of the first operation control. The client determines a movement direction of the foregoing first operation control based on a drag direction in the foregoing attribute information; and determines a movement distance of the first operation control based on a drag distance in the foregoing attribute information.

In some embodiments, the foregoing movement parameters include a position to which the first operation control is moved. The client determines a position to which the foregoing first operation control is moved based on an end position of a drag operation in the foregoing attribute information.

3. Adjust a display position of the first operation control according to the movement parameters.

In some embodiments, after obtaining the foregoing movement parameters, the client adjusts the display position of the first operation control in the user interface according to the movement parameters.

In some embodiments, the display position of the operation control is adjusted through the drag operation for the operation control. The operation is simple, and it is unnecessary to add additional display content to the user interface, which improves the simplicity of the user interface. Moreover, the movement distance and the movement direction of the operation control are determined based on the drag distance and the drag direction, or, the display position of the operation control is determined based on the end position of the drag operation, so that the position adjustment of the operation control is intuitive and convenient, and the efficiency of the position adjustment of the operation control is improved.

Figure 6:
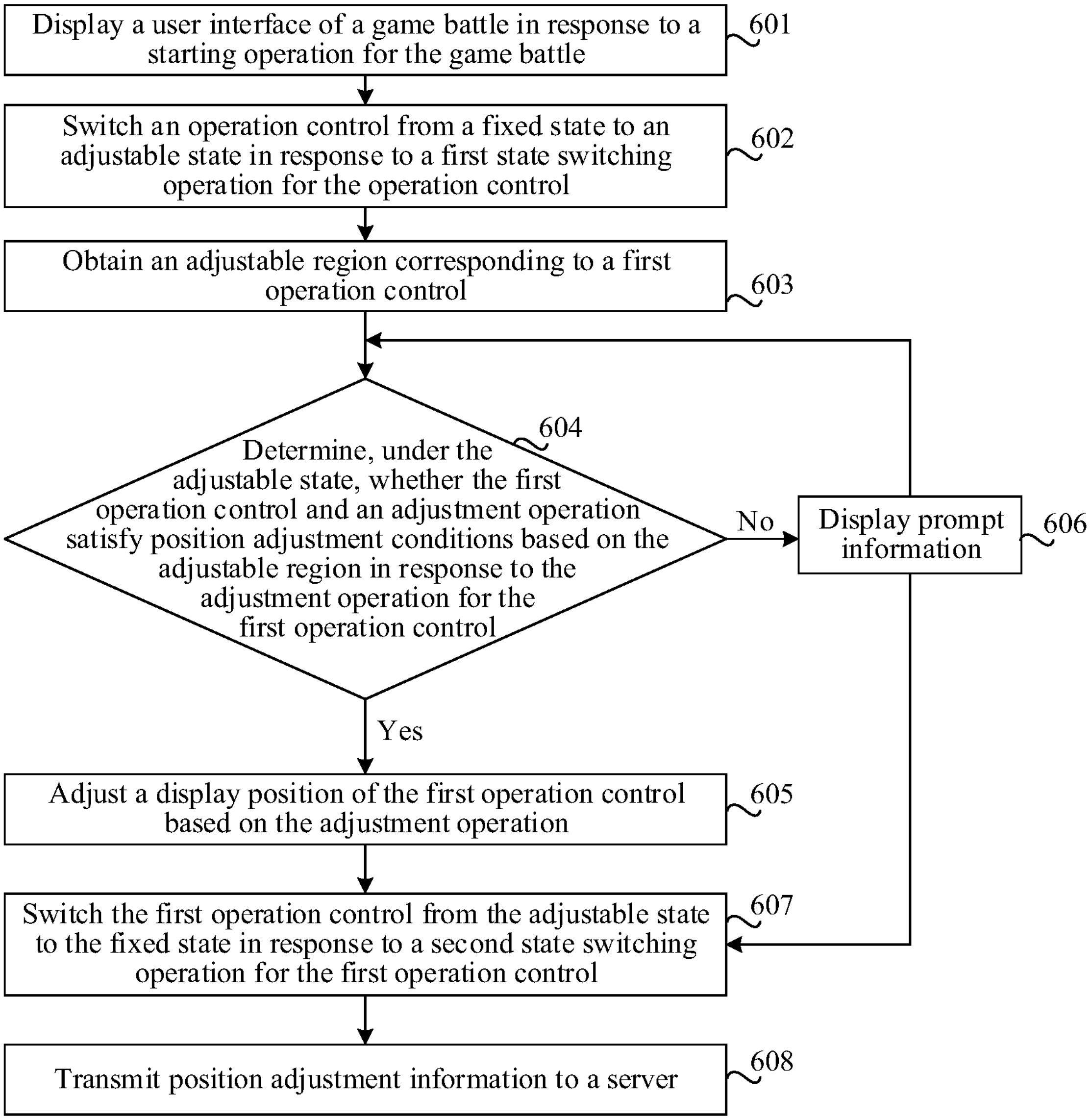
FIG. 6 is a flowchart of a position adjustment method for an operation control according to some embodiment.

FIG. 6 shows a flowchart of a position adjustment method for an operation control according to some embodiments. The method is applicable to the terminal 10 in the running environment of the application program shown in FIG. 1. For example, an execution entity of each operation may be a client of a target application program that is installed and run in the terminal 10. The method may include at least one of the following operations (601 to 606):

Operation 601: Display a user interface of a game battle in response to a starting operation for the game battle.

Operation 602: Switch the operation control from a fixed state to an adjustable state in response to a first state switching operation for the operation control.

The foregoing operation 601 and operation 602 are the same as operation 301 and operation 302 in the embodiment in FIG. 3, for specific details, referring to the embodiment in FIG. 3, which are not described here again.

Operation 603: Obtain an adjustable region corresponding to the first operation control.

The adjustable region refers to a moveable region of the first operation control, that is, the position of the first operation control can be flexibly adjusted within the adjustable region. In some embodiments, different operation controls correspond to different adjustable regions.

In some embodiments, the client determines the foregoing adjustable region based on a distance between the first operation control and another operation control. In some embodiments, when obtaining the adjustable region, the client obtains a display position of at least one operation control in the user interface, the at least one operation control include at least one other operation control and the foregoing first operation control. Further, the client determines an adjustable region corresponding to the first operation control based on the display position of the at least one operation control. A distance between an edge line of the adjustable region and another operation control closest to the edge line is greater than a threshold. In this case, the adjustable region of the first operation control does not cover display positions of other operation controls, that is, there is no overlapping region between the display positions of the operation controls, so that the user interface is tidier.

In some embodiments, the client determines the foregoing adjustable region based on trigger regions of other operation controls. In some embodiments, when obtaining the adjustable region, the client obtains trigger regions of other operation controls than the foregoing first operation control in the user interface, and takes a region that does not overlap with the trigger regions of the other operation controls in the user interface as an adjustable region corresponding to the first operation control. Different operation controls correspond to different trigger regions, and the foregoing trigger region may also be referred to as a response region. In some embodiments, the trigger region of the first operation control changes along with display position of the first operation control. Therefore, the adjustable region of the first operation control also changes along with the display position of the first operation control. In this case, the adjustable region of the first operation control will not cover the trigger regions of other operation controls, which reduces mistaken touch operations for other operation controls during the position adjustment of the first operation control.

Operation 604: Determine, under the adjustable state, whether the first operation control and the adjustment operation satisfy position adjustment conditions based on the adjustable region in response to an adjustment operation for the first operation control. In a case that both the first operation control and the adjustment operation satisfy the position adjustment conditions, operation 605 is performed. In a case that the first operation control or the adjustment operation does not satisfy the position adjustment conditions, operation 606 is performed.

In some embodiments, in a case that the first operation control is in the adjustable state, when detecting an adjustment operation for the first operation control, the client determines whether the first operation control and the adjustment operation satisfy the position adjustment conditions based on the foregoing adjustable region.

In some embodiments, in a case that the foregoing first operation control is not on an edge line of the adjustable region; or, the first operation control is on the edge line of the adjustable region, and the position adjustment operation instructs the first operation control to move from the edge line of the adjustable region to the interior of the adjustable region, it is determined that the first operation control and the adjustment operation satisfy the position adjustment conditions.

In some embodiments, in a case that the first operation control is on the edge line of the adjustable region, and the position adjustment operation instructs the first operation control to move from the edge line of the adjustable region to the exterior of the adjustable region, it is determined that the first operation control or the adjustment operation does not satisfy the position adjustment conditions.

A method for determining whether the first operation control is on the edge line will be described below. In some embodiments, in a case that an edge point of the first operation control is on the edge line, it is determined that the first operation control is on the edge line; or, in a case that a center point of the first operation control is on the edge line, it is determined that the first operation control is on the edge line.

Operation 605: Adjust a display position of the first operation control based on the adjustment operation.

In some embodiments, in a case that the first operation control and the adjustment operation satisfy the position adjustment conditions, under the adjustable state, in response to the foregoing adjustment operation, a display position of the first operation control is adjusted.

Operation 606: Display prompt information.

In the embodiments of the disclosure, in a case that the first operation control and the adjustment operation do not satisfy the position adjustment conditions, under the adjustable state, in response to the foregoing adjustment operation, prompt information is displayed. The prompt information is used for prompting that the position adjustment of the first operation control fails.

Operation 607: Switch the first operation control from the adjustable state to the fixed state in response to a second state switching operation for the first operation control.

Operation 608: Transmit position adjustment information to a server.

Based on the above, in the technical solutions provided in the embodiments of the disclosure, the operation control is limited to move within the adjustable region, which avoids the unusable problem caused by overlapping of the trigger region of the operation control and trigger regions of other operation controls after the operation control is moved, and improving a position adjustment effect of the operation control.

Figure 7:
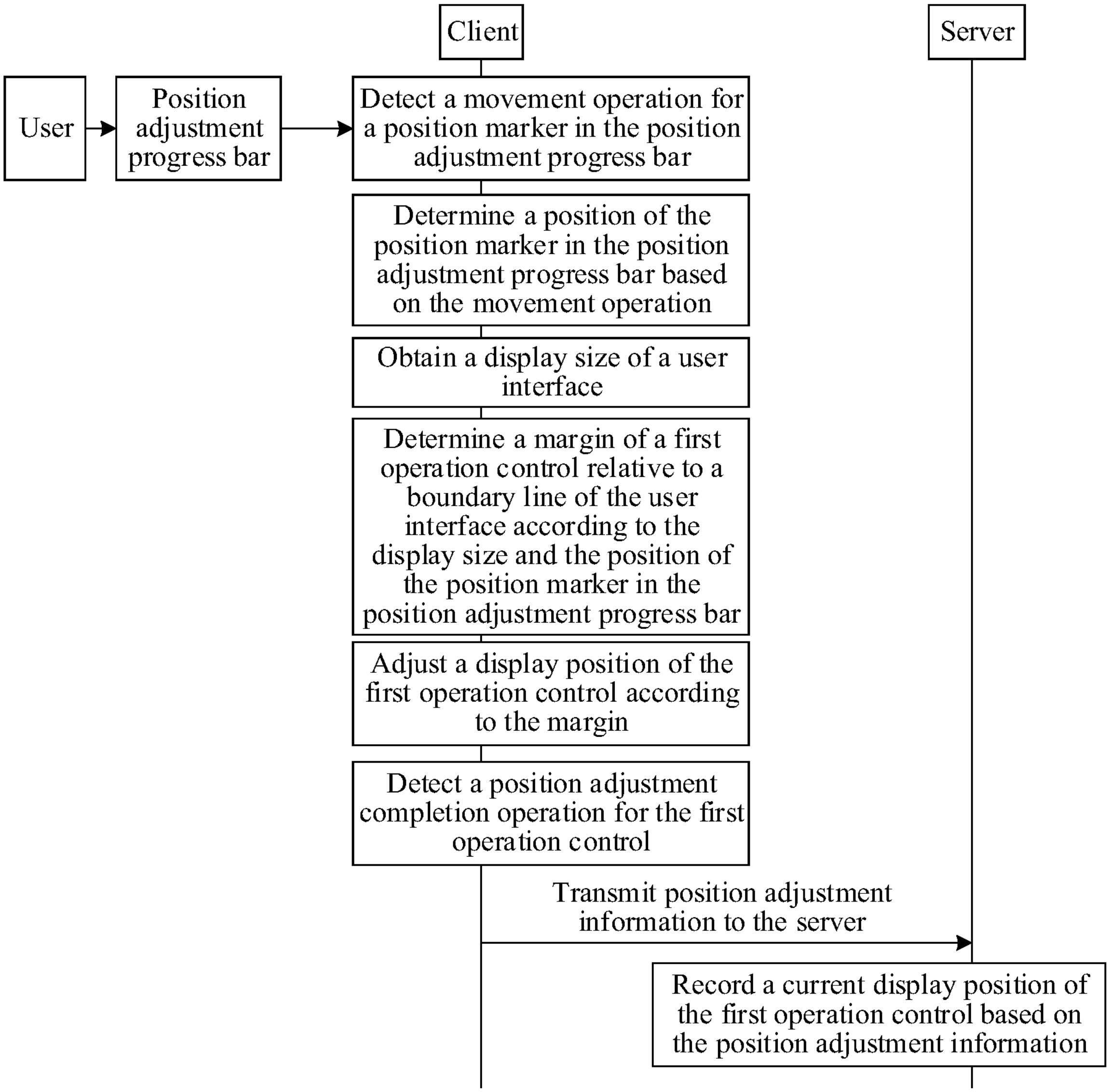
FIG. 7 is a schematic flowchart of a position adjustment method for an operation control according to some embodiments.

In addition, with reference to FIG. 7, an adjustment method for the first operation control will be described. At the client, the user adjusts the display position of the first operation control through the position adjustment progress bar, and the client receives a movement operation for the position marker in the position adjustment progress bar, determines a position of the position marker in the position adjustment progress bar based on the movement operation, obtains a display size of the user interface, determines a margin of the first operation control relative to the boundary line of the user interface according to the display size and the position of the position marker in the position adjustment progress bar, and adjusts the display position of the first operation control according to the margin. Further, the client detects a position adjustment completion operation (the foregoing second state switching operation) for the first operation control, and transmits position adjustment information to a server. The position adjustment information includes a current display position of the first operation control, and the server records the current display position of the first operation control based on the position adjustment information.

Figure 8:
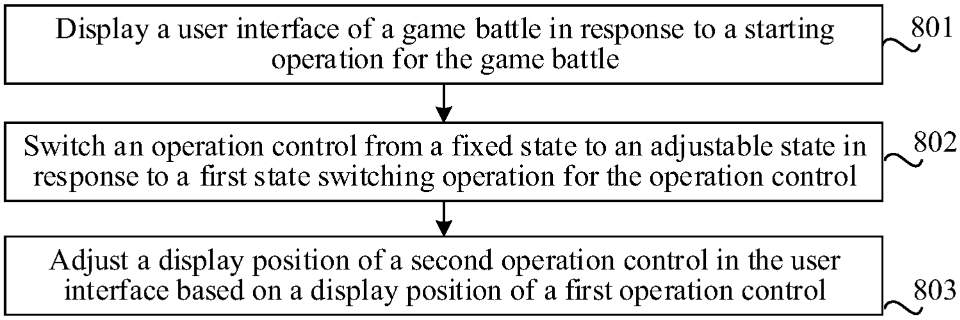
FIG. 8 is a flowchart of a position adjustment method for an operation control according to some embodiment.

FIG. 8 shows a flowchart of a position adjustment method for an operation control according to some embodiments. The method is applicable to the terminal 10 in the running environment of the application program shown in FIG. 1. For example, an execution entity of each operation may be a client of a target application program that is installed and run in the terminal 10. The method may include at least one of the following operations (801 to 806):

Operation 801: Display a user interface of a game battle in response to a starting operation for the game battle.

Operation 802: Switch the operation control from a fixed state to an adjustable state in response to a first state switching operation for the operation control.

The foregoing operation 801 and operation 802 are the same as operation 301 and operation 302 in the embodiment in FIG. 3, the specific details are not described here again.

Operation 803: Adjust a display position of a second operation control in the user interface based on a display position of a first operation control.

In the embodiments of the disclosure, after adjusting the display position of the first operation control, the client takes the adjusted display position of the first operation control as a reference, and adjusts a display position of a second operation control in the user interface based on the display position of the first operation control.

In some embodiments, the foregoing second operation control and the first operation control belong to the same group of operation controls. In this case, the client adjusts the display position of the second operation control based on the display position of the first operation control and a relative position between the first operation control and the second operation control, so that the relative position between the first operation control and the second operation control is kept unchanged after position adjustment.

In some embodiments, the foregoing second operation control and the foregoing first operation control belong to different groups of operation controls. In this case, the client adjusts a margin of the second operation control relative to the boundary line of the user interface based on the margin of the first operation control relative to the boundary line of the user interface. In some embodiments, in a case that a boundary line corresponding to the first operation control and a boundary line corresponding to the second operation control are the same boundary line, the sum of a margin of the first operation control relative to the boundary line of the user interface and a margin of the second operation control relative to the boundary line of the user interface is equal to a display length of the user interface. In a case that the boundary line corresponding to the first operation control and the boundary line corresponding to the second operation control are boundary lines parallel to each other, a margin of the first operation control relative to the boundary line of the user interface is equal to a margin of the second operation control relative to the boundary line of the user interface.

In some embodiments, the client groups operation controls based on functions and/or distribution regions of the operation controls.

In some embodiments, the client groups operation controls based on functions of the operation controls. In some embodiments, after displaying the foregoing user interface, the client obtains functions of operation controls, and divides operation controls with the same function into a group. For example, operation controls configured to cast a skill belong to the same group of operation controls, operation controls configured to control posture switching belong to the same group of operation controls, and operation controls configured to control movement directions belong to the same group of operation controls.

In some embodiments, the client groups operation controls based on distribution regions of the operation controls. In some embodiments, after displaying the foregoing user interface, the client obtains the distribution of operation controls, and divides operation controls distributed in the same region into a group. For example, when determining whether the operation controls are distributed in the same region, the client randomly selects an operation control, determines other operation controls whose distances to the operation control are less than a threshold as operation controls belonging to the same group as the operation control, and continues to select an operation control from ungrouped operation controls to repeat the foregoing operation until no ungrouped operation control is left.

In some embodiments, the client groups operation controls based on functions and distribution regions of the operation controls. For example, the client groups operation controls based on distribution regions of the operation controls, and on the basis of the obtained groups, subdivides the existing groups according to functions of the operation controls to obtain final grouping results.

Based on the above, in the technical solutions provided in the embodiments of the disclosure, during position adjustment of the operation control, the display position of the second operation control is also subjected to adaptive adjustment, which improves the efficiency of adjustment of the operation control.

With regard to a distance between two operation controls, unless otherwise specified, a distance may be calculated according to center points of the two operation controls, or a distance may be calculated according to edge points of the two operations.

Apparatus embodiments of the disclosure will be described below, which may be configured to perform the method embodiments of the disclosure. With regard to details not disclosed in the apparatus embodiments of the disclosure, reference may be made to the method embodiments of the disclosure.

Figure 9:
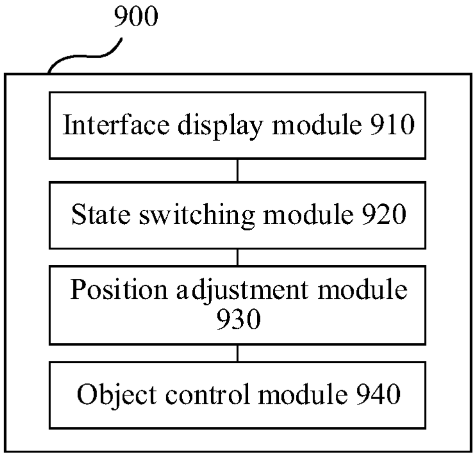
FIG. 9 is a block diagram of a position adjustment apparatus for an operation control according to some embodiment.

FIG. 9 shows a block diagram of a position adjustment apparatus for an operation control according to some embodiments. The apparatus has the function of implementing the foregoing position adjustment method for an operation control, and the function may be implemented by hardware, or may be implemented by executing corresponding software by hardware. The apparatus may be a terminal, or may be arranged in a terminal. The apparatus 900 may include an interface display module 910, a state switching module 920, a position adjustment module 930, and an object control module 940.

The interface display module 910 is configured to display a user interface of a game battle in response to a starting operation for the game battle, the user interface displaying at least one operation control.

The state switching module 920 is configured to switch the operation control from a fixed state to an adjustable state in response to a first state switching operation for the operation control.

The position adjustment module 930 is configured to adjust, under the adjustable state, a display position of a first operation control in response to an adjustment operation for the first operation control in the at least one operation control.

The object control module 940 is configured to control, under the adjustable state, a virtual object in the game battle to perform an action corresponding to the first operation control in response to a trigger operation for the first operation control.

Figure 10:
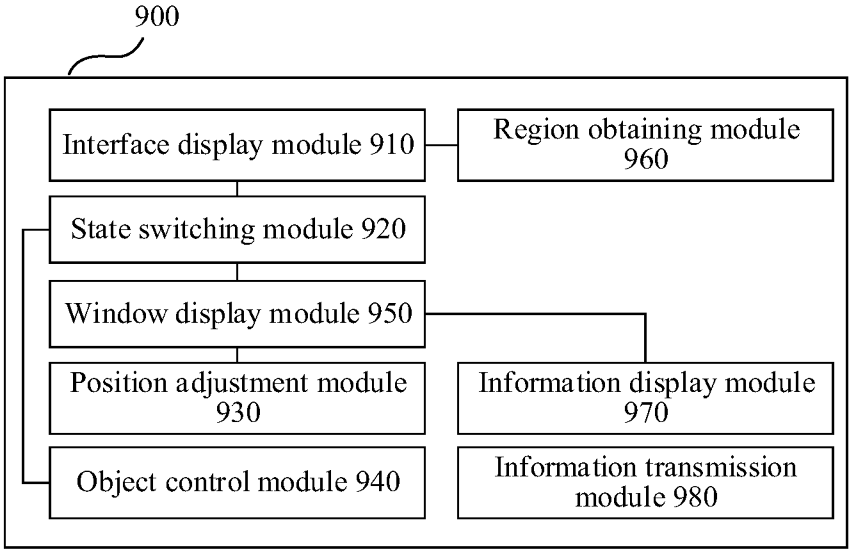
FIG. 10 is a block diagram of a position adjustment apparatus for an operation control according to some embodiment.

In some embodiments, as shown in FIG. 10, the apparatus 900 further includes: a window display module 950.

The window display module 950 is configured to display an adjustment window in response to the first state switching operation for the operation control, the adjustment window displaying a position adjustment control configured to adjust a display position of the operation control.

In some embodiments, the position adjustment module 930 is further configured to, in response to an operation for the position adjustment control, adjust the display position of the first operation control.

In some embodiments, the position adjustment control includes a position adjustment progress bar, and the position adjustment progress bar displays a position marker. The position adjustment module 930 is further configured to determine a position of the position marker in the position adjustment progress bar in response to a movement operation for the position marker; determine a margin of the first operation control relative to a boundary line of the user interface according to the position of the position marker in the position adjustment progress bar; and adjust a display position of the first operation control, so that a distance between the first operation control and the boundary line of the user interface is equal to the margin.

In some embodiments, the position adjustment module 930 is further configured to obtain a display size of the user interface; take the position marker as a division point, and determine a ratio of a length of a progress bar on the right side of the position marker to a total length of the position adjustment progress bar; and determine a margin of the first operation control relative to a boundary line of the user interface according to the ratio and the display size.

In some embodiments, the position adjustment module 930 is further configured to obtain attribute information of a drag operation in response to the drag operation for the first operation control; determine movement parameters of the first operation control based on the attribute information, the movement parameters including at least one of: a movement direction, a movement distance, and a position to which the first operation control is moved; and adjust a display position of the first operation control according to the movement parameters.

In some embodiments, the position adjustment module 930 is configured to determine a movement direction of the first operation control based on a drag direction in the attribute information; determine a movement distance of the first operation control based on a drag distance in the attribute information; or, determine a position to which the first operation control is moved based on an end position of the drag operation in the attribute information.

In some embodiments, as shown in FIG. 10, the apparatus 900 further includes: a region obtaining module 960 and an information display module 970.

The region obtaining module 960 is configured to obtain an adjustable region corresponding to the first operation control.

The position adjustment module 930 is further configured to perform the operation of adjusting, under the adjustable state, a display position of a first operation control in response to an adjustment operation for the first operation control in the at least one operation control in a case that the first operation control is not on an edge line of the adjustable region; or perform the operation of adjusting, under the adjustable state, a display position of a first operation control in response to an adjustment operation for the first operation control in the at least one operation control in a case that the first operation control is on the edge line of the adjustable region and the position adjustment operation instructs the first operation control to move from the edge line of the adjustable region to the interior of the adjustable region.

The information display module 970 is configured to display, under the adjustable state, prompt information in response to an adjustment operation for the first operation control in the at least one operation control in a case that the first operation control is on an edge line of the adjustable region, and the position adjustment operation instructs the first operation control to move from the edge line of the adjustable region to the exterior of the adjustable region, the prompt information being used for prompting that the position adjustment of the first operation control fails.

In some embodiments, the region obtaining module 960 is further configured to obtain a display position of the at least one operation control in the user interface, the at least one operation control including at least one other operation control and the first operation control; and determine an adjustable region corresponding to the first operation control based on the display position of the at least one operation control. A distance between an edge line of the adjustable region and another operation control closest to the edge line is greater than a threshold.

In some embodiments, the region obtaining module 960 is further configured to obtain trigger regions of other operation controls than the first operation control in the user interface; and take a region that does not overlap with the trigger regions of the other operation controls in the user interface as an adjustable region corresponding to the first operation control.

In some embodiments, the position adjustment module 930 is further configured to adjust a display position of a second operation control in the user interface based on the display position of the first operation control.

In some embodiments, the position adjustment module 930 is further configured to adjust a display position of the second operation control based on the display position of the first operation control and a relative position between the first operation control and the second operation control in a case that the second operation control and the first operation control belong to the same group of operation controls; or, adjust a margin of the second operation control relative to the boundary line of the user interface based on the margin of the first operation control relative to the boundary line of the user interface in a case that the second operation control and the first operation control belong to different groups of operation controls.

In some embodiments, as shown in FIG. 10, the apparatus 900 further includes: an information transmission module 980.

The state switching module 920 is further configured to switch the first operation control from the adjustable state to the fixed state in response to a second state switching operation for the first operation control.

The information transmission module 980 is configured to transmit position adjustment information to a server, the position adjustment information being used for instructing the server to record a current display position of the first operation control.

A person skilled in the art would understand that these “modules” could be implemented by hardware logic, a processor or processors executing computer software code, or a combination of both.

Based on the above, in the technical solutions provided in the embodiments of the disclosure, the operation control is switched from the fixed state to the adjustable state through the first state switching operation, and under the adjustable state, the display position of the operation control can be adjusted in response to the adjustment operation and the virtual object can be controlled to perform the corresponding action in response to the trigger operation. That is, in a case that a user adjusts the display position of the operation control, the operation control can respond to user’s trigger operation, so that the user can control the virtual object. In this way, after adjusting the display position of the operation control, the user can use the operation control in real time and then determine whether the effect (e.g., efficiency and use feel) of the operation control meets user's needs. Furthermore, during use of the operation control, the operation control is still in the adjustable state, and in a case that the user is not satisfied with a previous position adjustment result, the user may continue to adjust the display position of the operation control without reopening a setting interface of the operation control, which improves the efficiency of position adjustment of the operation control. Moreover, during position adjustment, the operation feel of the operation control is determined by using the operation control in real time, which is conductive to the optimization of a position adjustment effect on the operation control.

The apparatus provided in the foregoing embodiments, when implementing its functions, is described by taking the division of the foregoing functional modules as an example. In practice, the foregoing functions may be assigned to and completed by different functional modules as needed, that is, an internal structure of the device is divided into different functional modules to complete all or part of the foregoing functions. In addition, the apparatus provided in the foregoing embodiments and the method embodiments belong to the same concept, and for the specific implementation process of the apparatus, refer to the method embodiments for details, which is not described again here.

Figure 11:
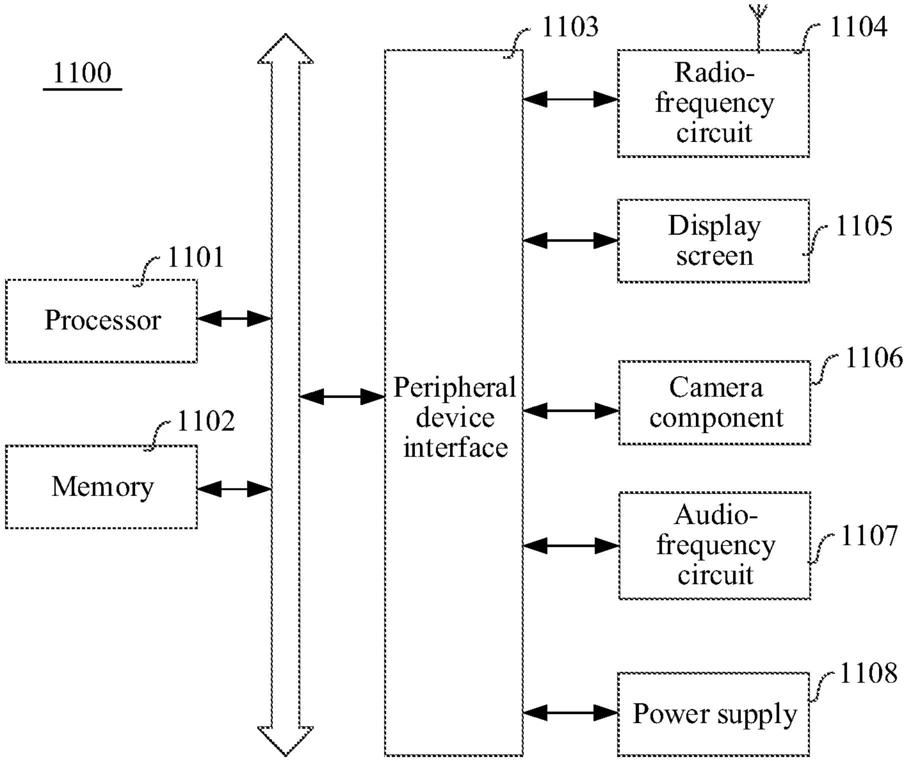
FIG. 11 is a structural block diagram of a terminal according to some embodiment.

FIG. 11 shows a structural block diagram of a terminal 1100 according to some embodiments. The terminal 1100 may be, for example, an electronic device such as a mobile phone, a tablet computer, a game console, an e-book reader, a multimedia playback device, a wearable device, and a personal computer (PC). The terminal is configured to implement the position adjustment method for an operation control provided in the foregoing embodiments. The terminal may be the terminal 10 in the game running environment shown in FIG. 1.

Usually, the terminal 1100 includes: a processor 1101 and a memory 1102.

The processor 1101 may include one or more processing cores, such as a 4-core processor and 8-core processor. The processor 1101 may be implemented by using at least one hardware form of digital signal processing (DSP), field programmable gate array (FPGA), and programmable logic array (PLA). The processor 1101 may also include a main processor and a co-processor. The main processor is a processor for processing data in a wakeup state, which is also referred to as a central processing unit (CPU). The co-processor is a low power processor for processing data in a standby state. In some embodiments, the processor 1101 may be integrated with a graphics processing unit (GPU). The GPU is configured to render and draw the content to be displayed by a display screen. In some embodiments, the processor 1101 may further include an artificial intelligence (AI) processor. The AI processor is configured to process computing operations related to machine learning.

The memory 1102 may include one or more computer-readable storage media. The computer-readable storage media may be non-transient. The memory 1102 may further include a high speed random access memory and a non-volatile memory, such as one or more disk storage devices and flash storage devices. In some embodiments, the non-transient computer-readable storage media in the memory 1102 are configured to store at least one instruction, at least one fragment of program, a code set or an instruction set. The at least one instruction, the at least one fragment of program, the code set or the instruction set is executed by one or more processors to implement the foregoing position adjustment method for an operation control.

In some embodiments, the terminal 1100 may further include: a peripheral device interface 1103 and at least one peripheral device. The processor 1101, the memory 1102, and the peripheral device interface 1103 may be connected via a bus or signal lines. Each peripheral device may be connected to the peripheral device interface 1103 via a bus, signal lines or a circuit board. Specifically, the peripheral devices include at least one of: a radio frequency circuit 1104, a display screen 1105, a camera component 1106, an audio circuit 1107, and a power supply 1108.

Those skilled in the art will appreciate that the structure shown in FIG. 11 is not intended to limit the terminal 1100, the terminal 1100 may include more or fewer components than those shown in the figure, or certain components are combined, or different component arrangements are adopted.

In some embodiments, a non-transitory computer-readable storage medium is further provided. The storage medium stores at least one instruction, at least one program, a code set or an instruction set, and when the at least one instruction, the at least one program, the code set or the instruction set is executed by a processor, the foregoing position adjustment method for an operation control is implemented.

In some embodiments, the computer-readable storage medium may include: a read only memory (ROM), a random access memory (RAM), a solid state drive (SSD), an optical disc or the like. The random access memory may include a resistance random access memory (ReRAM) and a dynamic random access memory (DRAM).

In some embodiments, a computer program product or computer program is further provided. The computer program product or computer program includes computer instructions, and the computer instructions are stored in a computer-readable storage medium. A processor of a terminal reads the computer instructions from the computer-readable storage medium and executes the computer instructions to cause the terminal to perform the foregoing position adjustment method for an operation control.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A position adjustment method for an operation control, performed by a computer device, comprising:

displaying a user interface of a game session based on a starting operation for the game session, the user interface displaying at least one operation control;

switching a first operation control of the at least one operation control from a fixed state to an adjustable state based on a first state switching operation;

adjusting, in the adjustable state, a display position of the first operation control based on an adjustment operation for the first operation control; and controlling, in the adjustable state, a virtual object in the game session to perform an action corresponding to the first operation control based on a trigger operation for the first operation control.

2. The position adjustment method according to claim 1, further comprising:

displaying an adjustment window based on the first state switching operation for the first operation control, the adjustment window displaying a position adjustment control configured to adjust the display position of the first operation control, wherein the adjusting the display position of the first operation control based on the adjustment operation for the first operation control comprises:

adjusting the display position of the first operation control based on an operation of the position adjustment control.

3. The position adjustment method according to claim 2, wherein the position adjustment control comprises a position adjustment progress bar, and the position adjustment progress bar displays a position marker; and the adjusting the display position comprises:

determining a position of the position marker in the position adjustment progress bar based on a movement operation of the position marker;

determining a margin of the first operation control relative to a boundary line of the user interface according to the position of the position marker in the position adjustment progress bar; and adjusting the display position of the first operation control so that a distance between the first operation control and the boundary line of the user interface is equal to the margin.

4. The position adjustment method according to claim 3, wherein the determining the margin comprises:

obtaining a display size of the user interface;

determining a ratio of a length of a portion of the position adjustment progress bar on the right side of the position marker to a total length of the position adjustment progress bar; and determining the margin of the first operation control relative to the boundary line of the user interface according to the ratio and the display size.

5. The position adjustment method according to claim 1, wherein the adjusting the display position comprises:

obtaining attribute information of a drag operation of the first operation control;

determining movement parameters of the first operation control based on the attribute information, the movement parameters comprising at least one of: a movement direction, a movement distance, or a movement position to which the first operation control is moved; and adjusting the display position of the first operation control according to the movement parameters.

6. The position adjustment method according to claim 5, wherein the determining the movement parameters comprises at least one of:

determining the movement direction of the first operation control based on a drag direction in the attribute information; and determining the movement distance of the first operation control based on a drag distance in the attribute information; or determining the movement position to which the first operation control is moved based on an end position of the drag operation in the attribute information.

7. The position adjustment method according to claim 1, further comprising, after the switching the first operation control from the fixed state to the adjustable state:

obtaining an adjustable region corresponding to the first operation control;

performing an operation of adjusting, in the adjustable state, at least one of:

the display position of the first operation control based on the adjustment operation for the first operation control based on the first operation control not being on an edge line of the adjustable region; or the display position of the first operation control based on the adjustment operation of the first operation control, the first operation control being on the edge line of the adjustable region, and the adjustment operation instructing the first operation control to move from the edge line of the adjustable region to an interior of the adjustable region; and displaying, in the adjustable state, prompt information based on the adjustment operation for the first operation control based on the first operation control being on the edge line of the adjustable region and the adjustment operation instructing the first operation control to move from the edge line of the adjustable region to the exterior of the adjustable region, the prompt information prompting that an adjustment of the first operation control fails.

8. The position adjustment method according to claim 7, wherein the obtaining the adjustable region comprises:

obtaining the display position of the at least one operation control in the user interface, the at least one operation control comprising at least one other operation control and the first operation control; and determining the adjustable region corresponding to the first operation control based on the display position of the at least one operation control, a distance between the edge line of the adjustable region and another operation control closest to the edge line being greater than a threshold.

9. The position adjustment method according to claim 7, wherein the obtaining the adjustable region comprises:

obtaining trigger regions of operation controls of the at least one operation control other than the first operation control in the user interface; and taking a region that does not overlap with the trigger regions of the other operation controls in the user interface as the adjustable region corresponding to the first operation control.

10. The position adjustment method according to claim 1, further comprising, after the adjusting the display position of the first operation control:

adjusting a display position of a second operation control in the user interface based on the display position of the first operation control.

11. The position adjustment method according to claim 10, wherein the adjusting the display position comprises at least one of:

adjusting the display position of the second operation control based on the display position of the first operation control and a relative position between the first operation control and the second operation control based on the second operation control and the first operation control belonging to a same group of operation controls; or adjusting a margin of the second operation control relative to a boundary line of the user interface based on the margin of the first operation control relative to the boundary line of the user interface based on the second operation control and the first operation control belonging to different groups of operation controls.

12. The position adjustment method according to claim 1, wherein after the adjusting the display position of the first operation control, the position adjustment method further comprises:

switching the first operation control from the adjustable state to the fixed state based on a second state switching operation for the first operation control; and transmitting position adjustment information to a server, the position adjustment information instructing the server to record a current display position of the first operation control.

13. A position adjustment apparatus for an operation control, comprising:

at least one memory configured to store program code; and at least one processor configured to read the program code and operate as instructed by the program code, the program code comprising:

interface display code configured to cause the at least one processor to display a user interface of a game session based on a starting operation for the game session, the user interface displaying at least one operation control;

state switching code configured to cause the at least one processor to switch a first operation control of the at least one operation control from a fixed state to an adjustable state based on a first state switching operation;

position adjustment code configured to cause the at least one processor to adjust, in the adjustable state, a display position of the first operation control based on an adjustment operation for the first operation control; and object control code configured to cause the at least one processor to control, in the adjustable state, a virtual object in the game session to perform an action corresponding to the first operation control based on a trigger operation for the first operation control.

14. The position adjustment apparatus according to claim 13, wherein the program code further comprises:

window display code configured to display an adjustment window in response to the first state switching operation for the operation control, the adjustment window displaying a position adjustment control configured to adjust a display position of the operation control; and wherein the position adjustment code is further configured to cause the at least one processor to adjust the display position of the first operation control based on an operation of the position adjustment control.

15. The position adjustment apparatus according to claim 14, wherein the position adjustment control comprises a position adjustment progress bar, and the position adjustment progress bar displays a position marker; and the position adjustment code is further configured to cause the at least one processor to:

determine a position of the position marker in the position adjustment progress bar based on a movement operation of the position marker;

determine a margin of the first operation control relative to a boundary line of the user interface according to the position of the position marker in the position adjustment progress bar; and adjust the display position of the first operation control, so that a distance between the first operation control and the boundary line of the user interface is equal to the margin.

16. The position adjustment apparatus according to claim 15, wherein the position adjustment code is further configured to cause the at least one processor to:

obtain a display size of the user interface;

determine a ratio of a length of a portion of the position adjustment progress bar on the right side of the position marker to a total length of the position adjustment progress bar; and determine, the margin of the first operation control relative to the boundary line of the user interface according to the ratio and the display size.

17. The position adjustment apparatus according to claim 13, wherein the position adjustment code is further configured to cause the at least one processor to:

obtain attribute information of a drag operation of the first operation control;

determine movement parameters of the first operation control based on the attribute information, the movement parameters comprising at least one of: a movement direction, a movement distance, or a movement position to which the first operation control is moved; and adjust the display position of the first operation control according to the movement parameters.

18. The position adjustment apparatus according to claim 17, wherein the position adjustment code is further configured to cause the at least one processor to perform at least one of:

determine the movement direction of the first operation control based on a drag direction in the attribute information and determine the movement distance of the first operation control based on a drag distance in the attribute information; or determine the movement position to which the first operation control is moved based on an end position of the drag operation in the attribute information.

19. The position adjustment apparatus according to claim 13, wherein the program code further comprises:

region obtaining code configured to cause the at least one processor to obtain an adjustable region corresponding to the first operation control, wherein the position adjustment code is further configured to cause the at least one processor to perform the operation of adjusting, in the adjustable state, at least one of:

the display position of the first operation control based on the adjustment operation of the first operation control based on the first operation control not being on an edge line of the adjustable region; or the display position of the first operation control based on the adjustment operation for the first operation control based on the first operation control being on the edge line of the adjustable region and the adjustment operation instructing the first operation control to move from the edge line of the adjustable region to an interior of the adjustable region; and the program code further comprising:

information display code configured to cause the at least one processor to display, in the adjustable state, prompt information based on the adjustment operation for the first operation control based on the first operation control being on the edge line of the adjustable region and the adjustment operation instructing the first operation control to move from the edge line of the adjustable region to the exterior of the adjustable region, the prompt information prompting that an adjustment of the first operation control fails.

20. A non-transitory computer-readable storage medium storing computer code that when executed by at least one processor causes the at least one processor to:

display a user interface of a game session based on a starting operation for the game session, the user interface displaying at least one operation control;

switch a first operation control of the at least one operation control from a fixed state to an adjustable state based on a first state switching operation;

adjust, in the adjustable state, a display position of the first operation control based on an adjustment operation for the first operation control; and control, in the adjustable state, a virtual object in the game session to perform an action corresponding to the first operation control based on a trigger operation for the first operation control.

* * * * *